United States Patent [19]

Crossland et al.

[11] Patent Number: 5,942,456
[45] Date of Patent: Aug. 24, 1999

[54] MULTI-FUNCTIONAL CATALYTIC DISTILLATION STRUCTURE

[75] Inventors: Clifford S. Crossland; John R. Adams, both of Pasedena, Tex.

[73] Assignee: Catalytic Distillation Technologies, Pasadena, Tex.

[21] Appl. No.: 08/762,323

[22] Filed: Dec. 9, 1996

[51] Int. Cl.$^6$ ............................... B01J 35/02; B01J 33/02
[52] U.S. Cl. ............................ 502/2; 502/527; 422/191; 422/211; 422/311
[58] Field of Search ...................... 502/2, 527; 422/191, 422/211, 311

[56] References Cited

U.S. PATENT DOCUMENTS

| | | | |
|---|---|---|---|
| 4,215,011 | 7/1980 | Smith, Jr. | 252/426 |
| 4,232,177 | 11/1980 | Smith, Jr. | 585/324 |
| 4,242,530 | 12/1980 | Smith, Jr. | 585/510 |
| 4,250,052 | 2/1981 | Smith, Jr. | 252/426 |
| 4,302,356 | 11/1981 | Smith, Jr. | 252/426 |
| 4,307,254 | 12/1981 | Smith, Jr. | 568/697 |
| 4,336,407 | 6/1982 | Smith, Jr. | 568/697 |
| 4,439,350 | 3/1984 | Jones, Jr. | 502/527 |
| 4,443,559 | 4/1984 | Smith, Jr. | 502/527 |
| 4,447,668 | 5/1984 | Smith, Jr. et al. | 585/639 |
| 4,455,339 | 6/1984 | Meier | 428/185 |
| 4,482,775 | 11/1984 | Smith, Jr. | 585/671 |
| 4,497,751 | 2/1985 | Pluss | 261/94 |
| 4,497,752 | 2/1985 | Huber | 261/95 |
| 4,497,753 | 2/1985 | Streiff | 261/95 |
| 4,731,229 | 3/1988 | Sperandio | 422/188 |
| 4,744,928 | 5/1988 | Meier | 261/95 |
| 4,849,569 | 7/1989 | Smith, Jr. | 585/446 |
| 4,950,834 | 8/1990 | Arganbright et al. | 585/446 |
| 5,266,546 | 11/1993 | Hearn | 502/300 |
| 5,321,163 | 6/1994 | Hickey et al. | 568/59 |
| 5,348,710 | 9/1994 | Johnson et al. | 422/211 |
| 5,395,981 | 3/1995 | Marker | 568/697 |
| 5,431,890 | 7/1995 | Crossland et al. | 422/211 |
| 5,449,501 | 9/1995 | Luebke et al. | 422/193 |

FOREIGN PATENT DOCUMENTS

| | | |
|---|---|---|
| 1186647 | 4/1970 | United Kingdom . |
| 1471442 | 4/1977 | United Kingdom . |
| 1569828 | 6/1980 | United Kingdom . |
| 0396650 | 10/1992 | United Kingdom . |

*Primary Examiner*—Michael Lewis
*Assistant Examiner*—Alexander G. Ghyka
*Attorney, Agent, or Firm*—Kenneth H. Johnson

[57] ABSTRACT

A catalytic distillation structure containing (1) a solid catalytic material comprising a catalyst component and (2) a structure. The total volume of open space for the catalytic distillation structure should be at least 10 volume % and preferably at least 20 volume % up to about 65 volume %. The catalytic material may be a mixture of two or more catalysts or the individual catalyst may occupy separate and distinct areas of the structure without physical mixing of the catalysts. The structural element may contain substantially rigid elements and porous containers which contain the catalytic material. The structural element may be comprised of the porous containers. Other catalytic distillation structures may comprises the porous containers for the catalysts and a resilient material such as demister wire.

9 Claims, 4 Drawing Sheets

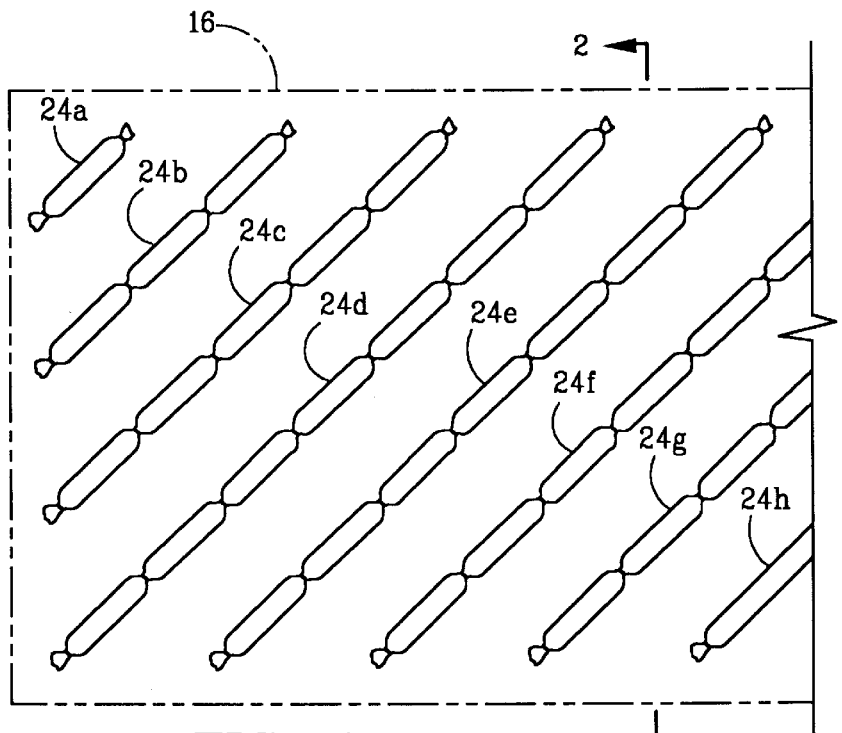
FIG. 1
FIG. 2
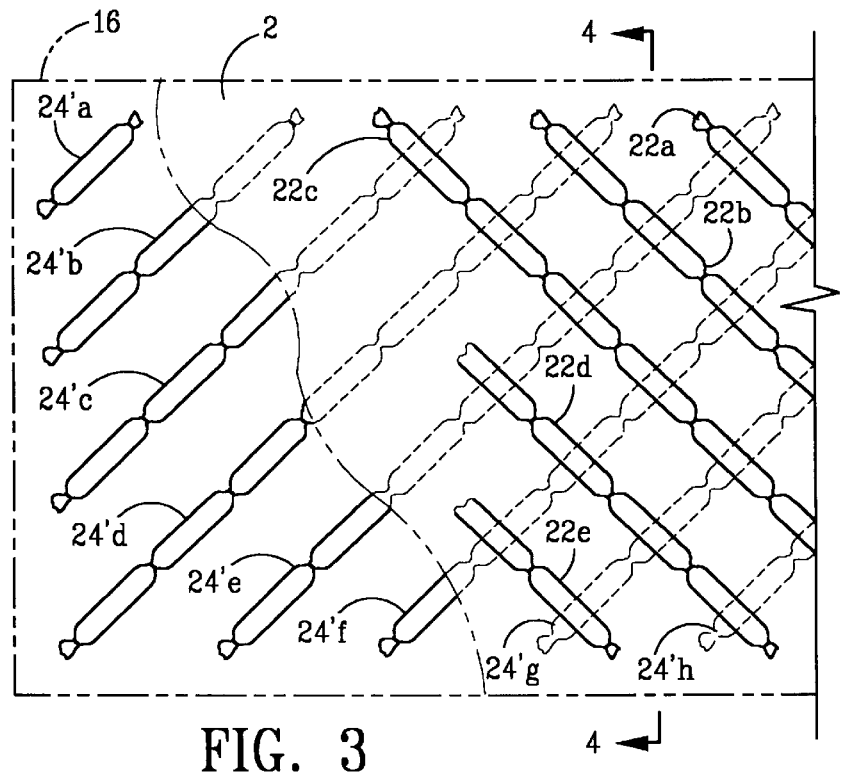
FIG. 3
FIG. 4

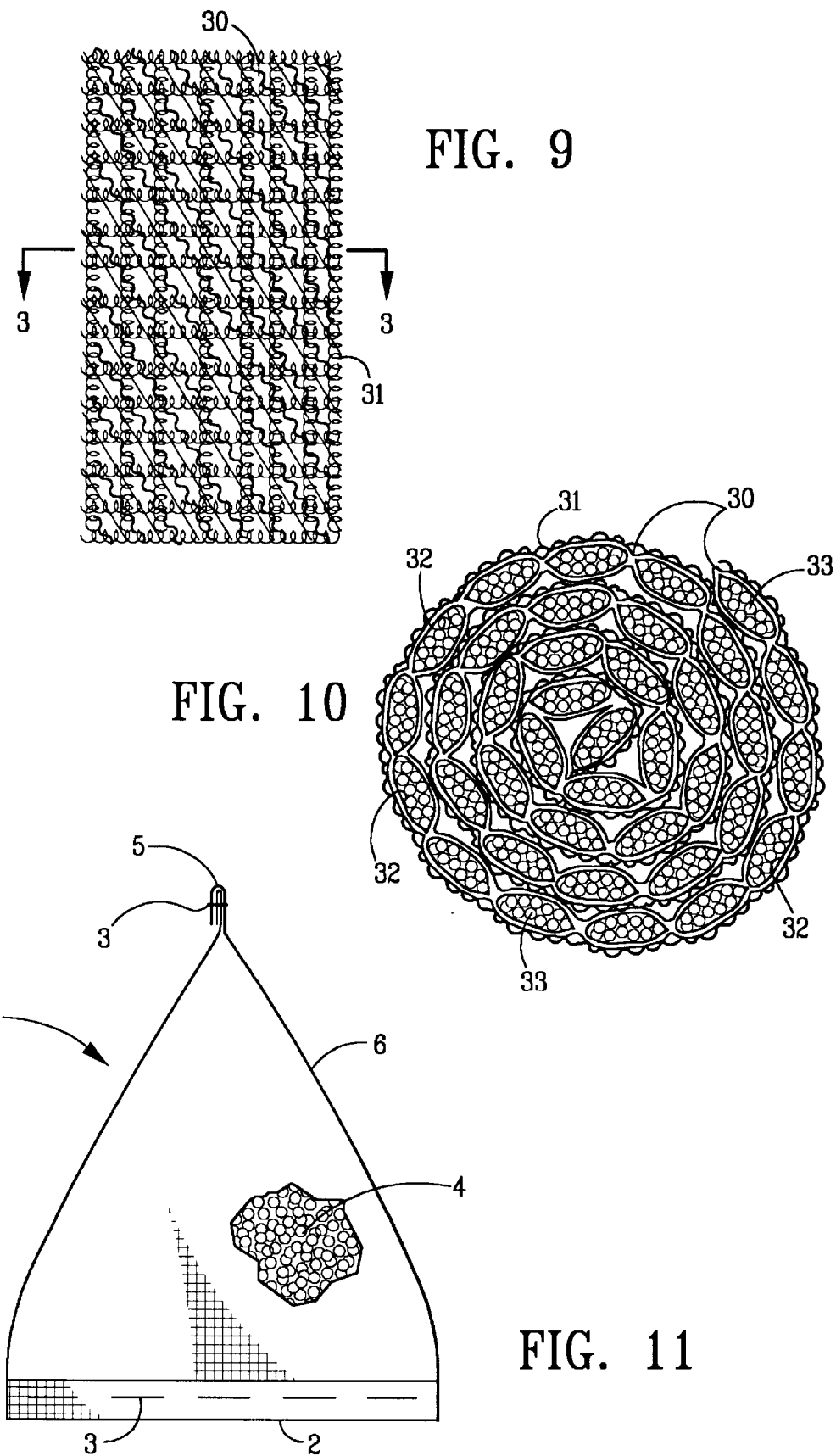

MULTI-FUNCTIONAL CATALYTIC DISTILLATION STRUCTURE

BACKGROUND OF THE INVENTION

1. Field of the Invention

The present invention relates to a structure which can be used in reactions wherein the reaction and distillation of the reaction system are carried out concurrently using the structure as both catalyst for the reaction and as a distillation structure. More particularly the invention relates to a catalytic distillation structure capable of carrying out more than one reaction.

2. Related Art

In one method of carrying out catalytic reactions the components of the reaction system are concurrently separable by distillation, using the catalyst structures as the distillation structures. This method is now generally known as catalytic distillation and any reference to catalytic distillation herein will be taken to mean this method or process. Such systems are described variously in U.S. Pat. Nos. 4,215,011; 4,232,177; 4,242,530; 4,302,356; 4,307,254; 4,336,407; 4,439,350; 4,447,668; 4,482,775 and 4,849,569.

U.S. Patent Nos. 4,250,052; 4,443,559; 5,266,546; 5,348,710 and 5,431,890 disclose a variety of catalyst structures for this use. European Pat. No. 0396650 discloses a catalytic distillation structure comprising semirigid mesh like walls containing catalyst material and formed into channels which are layered together such that the flow of the channels cross. U.S. Pat. No. 4,731,229 discloses a similar packing. Other distillation packings are shown in U.S. Pat. Nos. 4,455,339; 4,497,751; 4,497,752; 4,744,928 and 4,497,735 and UK patents 1,471,442; 1,569,828 and 1,186,647.

The use of multipurpose beds of different catalysts used in catalytic distillation reactions is disclosed in U.S. Pat. Nos. 4,950,834 and 5,321,163.

SUMMARY OF THE INVENTION

Briefly, the present invention comprises utilization of more than one different catalyst component in a catalytic distillation structure. Each catalytic distillation structure containing (1) a solid catalytic material comprising at least two different catalyst components and (2) a structural element. The central feature of the present invention is the presence of at least two different catalysts within the catalytic distillation structure. The catalyst may be functionally different, i.e., a resin etherification catalyst and a alumina supported metal hydrogenation catalyst; or the catalysts may be functionally the same, but chemically different, i.e., a resin etherification catalyst and a zeolite etherification catalyst or different species of the same root catalyst, such as a sulfonated resin and a halogen containing sulfonated resin. It is not known that there has ever been a proposal to use the related species catalyst in admixture. It is known that the practice in the art and industry is to use them separately.

The total volume of open space for the catalytic distillation structure should be at least 10 volume % and preferable at least 20 volume % up to about 65 volume %. Thus, preferably the catalyst component and the structural element should comprise about 35 volume % to 80 volume % of the total catalytic distillation structure. The structural element may contain substantially rigid elements and at least one porous container which contain the catalytic material. The structural element may be comprised of the porous containers. Other catalytic distillation structures may comprise the porous containers and a resilient material which is comprised of at least 70 volume % open space up to about 95 volume % open space. One suitable such material is open mesh knitted stainless wire, known generally as demister wire or an expanded wire or an expanded aluminum. Other resilient components may be similar open mesh knitted polymeric filaments of nylon, Teflon and the like.

In any of the catalytic distillation structures the catalytic material may be a mixture of two or more catalysts or the individual catalyst may occupy separate and distinct areas of the structure without physical mixing of the catalysts.

BRIEF DESCRIPTION OF THE DRAWINGS

FIG. 1 shows one embodiment of the present invention comprising multiple link catalyst distillation structures arrayed on a wire mesh screen.

FIG. 2 is a side view of the catalytic distillation structure shown in FIG. 1 along line 2—2.

FIG. 3 shows an alternative embodiment of the present invention comprising a stack arrangement.

FIG. 4 is a side view of the catalytic distillation structure shown in FIG. 3 along line 4—4.

FIG. 9 shows a second embodiment utilizing a cloth belt having pockets containing the catalyst and rolled together with demister wire.

FIG. 10 shows a top view of the second embodiment with the cloth belt rolled into a bale with the sheet of demister wire.

FIG. 11 is a perspective view of a single catalytic distillation structure containing at least two different catalysts.

DETAILED DESCRIPTION AND PREFERRED EMBODIMENTS

Figure 5:
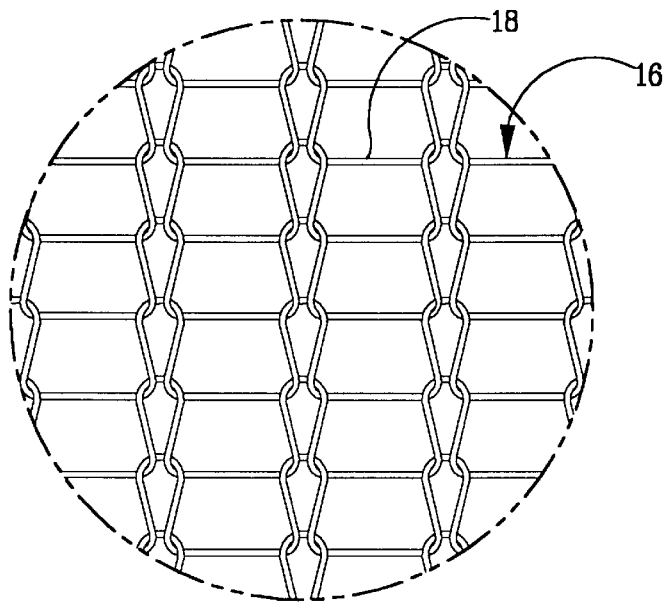
FIG. 5 is a close-up view of the sheet of woven wire mesh used in the present invention.

The present invention provides a catalytic distillation structure for use in reactions, which can be used as a distillation structure. In order to serve both functions, it has been found that the structure must meet three criteria. First, the structure must be such as to provide for even spatial dispersement in the reactor distillation column. That is, the catalyst structures must rest in the column in a geometric arrangement which will perform the desired functions of reaction and distillation sites. To achieve this the structure must be such as to provide fairly uniform spatial distribution in the column.

A second criteria is that there must be sufficient free space in the catalyst bed to allow for the liquid phase surface contact and vapor phase distillation with the concurrent separation of the material in the column by the distillation into vapor and liquid phases. It has been observed that in the catalyst bed a free space of about 50 volume % is adequate to obtain an operable fractionation.

A third criteria is the necessity for the catalyst bed to be able to expand and contract as it must during use without undue attrition of the catalyst.

The present invention meets all of the criteria in a superior manner.

The catalytic material may take several forms. In the case of particulate catalytic material, generally from 60 mm to about 1 mm down through powders, it is enclosed in a porous container such as cloth, screen wire, or polymeric mesh. The material used to make the container must be inert to the reactants and conditions in the reaction system. The screen wire may be aluminum, steel, stainless steel, and the like. The polymer mesh may be nylon, teflon, or the like. The mesh or threads per inch of the material used to make the container is such that the catalyst is retained therein and will not pass through the openings in the material. Although the catalyst particles of about 0.15 mm size or powders may be used, particles of up to about ¼ inch diameter may be employed in the containers.

In one embodiment the catalyst particles are placed into flexible, semi-rigid open mesh tubular elements which are sealed at both ends. The tubular elements are placed at an angle across a sheet of demister wire and then rolled into a bale similar to the first embodiment. The tubular shaped container may be composed of a wire mesh tube that has been closed by flattening the tube together at one end with a fastener such as staples or other appropriate means such as crimping, welds, or sewn metal, etc. The tube container is then filled with the appropriate catalytic material. The second end of the wire mesh tube is closed in a like manner as the first end, so that the axis of the second closed end is in the same plane as the first closed end. This process may be repeated several times to obtain multiple tubular links filled with a catalytic material. The tubular elements are then filled with a mixture of the functional catalyst particles. In the alternative, the individual tubes are filled with different catalyst and arranged on the demister wire sheet in the desired ratio of one catalyst to the other. Finally, the individual links on a single tubular are filled with different catalyst.

In another embodiment the catalysts particles are contained in pockets on a cloth belt which is then rolled together with a sheet of demister wire to make a bale. A mixture of the different catalysts particles may be placed into the pockets. Alternatively the individual pockets may be filled with the different catalysts.

Figure 7:
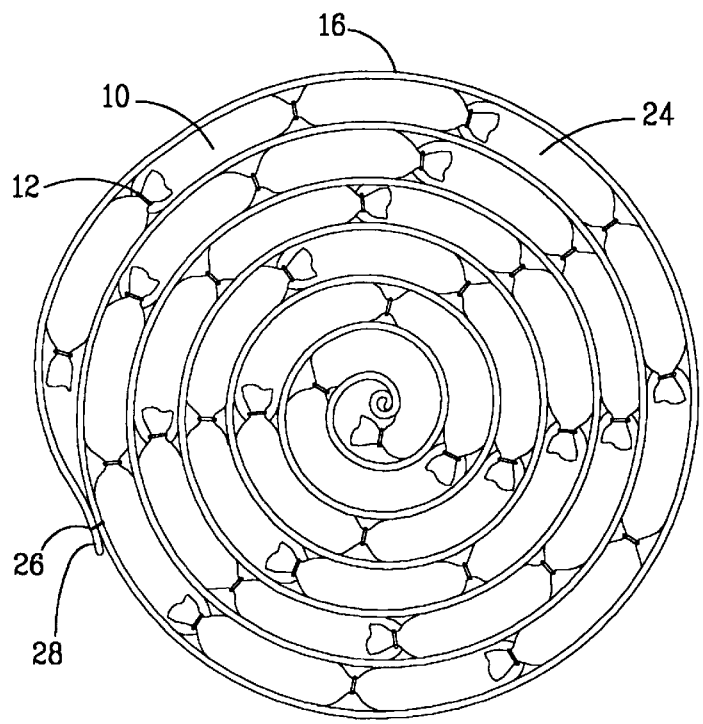
FIG. 7 is a top view of the structure shown in FIG. 1, that has been rolled up to form a bale shaped catalytic distillation structure.
Figure 8:
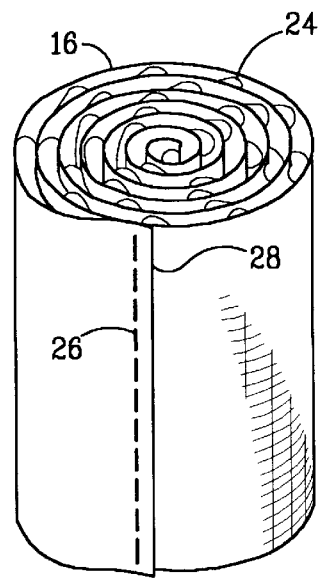
FIG. 8 is a perspective view of the catalytic distillation structure shown in FIG. 7.

In FIG. 1, the link structure 24 filled with catalytic material is placed on top of a sheet of demister wire 16. The demister wire 16 can be of any size, thickness, or design, desired to obtain an efficient catalytic distillation. FIG. 5 shows a close-up view of a typical demister wire 16 having interconnected wires 8 to form a wire mesh. The link structures 24 are placed on top of the rectangular sheet of demister wire 16, diagonally along the length of the sheet of demister wire 16. The continuous 24h and link tubular elements 24a–g may be intermixed or all of the tubes in a layer or catalytic distillation structure may be either type. The invention is illustrated principally with the preferred link type tubes, however the continuous tubes are exactly the same as the tubular elements 22a–e and 24a–g with the fasteners 12 omitted. The sheet of demister wire 16 is then rolled lengthwise and stapled or otherwise attached to the adjacent portion of the screen along the free edge 28 by staples 26 to create a bale shaped catalytic structure as shown in FIGS. 7 and 8. Although not shown the tubular element may be attached, for example by staples to the wire screen in order to facilitate manufacture and to insure that the tubes will stay in place throughout their use.

In one embodiment the catalytic material is comprised of a mixture of two or more different catalysts and all of the tubular elements are filled with mixture. In a variation of this embodiment, different ratios of catalysts are used in some of the tubular elements.

In another embodiment, as represented by FIG. 1 a first catalytic composition is used to fill tubes 24a, 24c, 24e, and 24g and a second catalytic composition is used to fill tubes 24b, 24d, 24f and 24h. The catalytic composition can be either a single catalyst or mixtures of catalyst as described above.

FIG. 3 shows an alternative embodiment of the present invention. A second sheet of demister wire 20 is placed on top of the structure found in FIG. 1, with the multiple link tubular elements 22a–e placed on top of the first sheet of demister wire 20, in diagonally opposite rows to the tubular elements 24'a–h found on the sheet of demister wire 16. The two sheets of demister wire 16, 20, are then rolled together lengthwise toward the inside to create a bale shaped catalytic structure of the same type as shown in FIGS. 7 and 8. The internal placement of the multiple link structures form a spiral arrangement in the bale. Multiple stacks, having different configurations, may be rolled to create any desired bale configuration.

The continuous tube shaped catalytic distillation structure may be used interchangeably in the same manner as the multiple link shaped structure to create new bale shaped catalytic distillation structures.

In a further embodiment as represented in FIG. 3 a first catalytic composition is used to fill tubes 24 and a second catalytic composition is used to fill tubes 22. The catalytic composition can be either a single catalyst or mixtures of catalysts as described above.

Figure 6:
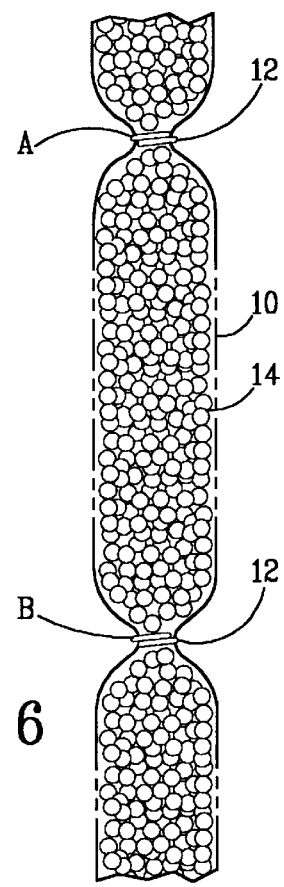
FIG. 6 shows a tubular element.

Referring to FIG. 6, a wire mesh tube 10 is closed at one point A with a fastener 12, which may be wire, crimping, welds, or sewn metal. The wire mesh tube 10 is then filled with a catalyst component 14 and the second point B is closed by a fastener 12. This filling procedure is repeated several times until the desired number of links are obtained.

In FIG. 7 the end of each row of tubular elements 24 is visible. In FIG. 8 the completed bale is shown in perspective view.

The bale shaped structures found in FIGS. 7 and 8 are ready for insertion into a column suitable for catalytic distillation.

The bale shaped catalytic distillation structures may be configured in any order within the catalytic distillation column to achieve the results desired.

In the place of the wire mesh, equivalent materials made from polymers may be used. In place of staples or sewn seams, adhesives may be used, with the only proviso being that the materials employed withstand attack by the materials and conditions in the reactor distillation column.

The size of catalyst components and the relative amount of the resilient component associated therewith or surrounding the catalyst components will determine the open space in the bed, which should be at least about 10 volume % and preferably at least 20 volume %. In the case of longer beds, it may be desirable to have a larger open space, thus a larger volume of the resilient material compared to the catalyst component would be employed.

Although the present catalytic distillation structures are especially useful for a process where there is a concurrent reaction distillation, it is also very useful for vapor phase reactions, since the catalyst bed prepared from the present structure provides a very low pressure drop therethrough.

The catalytic material may be any material, appropriate for the reaction at hand, that is, it may be an acid catalyst or a basic catalyst or others such as catalytic metals and their oxides or halides, suitable for a multitude of catalytic reactions and, of course, heterogeneous with the reaction or other fluids in the system. Some specific reactions are:

| CATALYST | REACTION |
| --- | --- |
| Acid cation exchange resins | dimerization, polymerization, etherification, alkylation esterification, isomerization |
| Magnesia, chromia, brucite, | isomerization |
| Molecular sieves (synthetic alumino-silicates), Ni, Pd | dimerization, polymerization, alkylation, isomerization, selective hydrogenation, dehydrogenation |
| Cobalt thoria | Fisher-Tropsch process |
| Cobalt molybdate | hydrofining |

When multiple functions are needed more than one of the catalyst components can be placed into the tubular elements. The desired ration of catalysts may be obtained by alternating one element each containing the separate catalysts or alternating two having one catalyst and one having the other, etc. Finally the individual links on a tubular element may be loaded with different catalyst in the desired ratio. Again the desired ratio may be obtained by alternating links one to one or in any other desired ratio.

The material for forming the tubular container may be the wire mesh materials, such as stainless steel, expanded aluminum, or the like. Suitable adhesives such as epoxys or various of the hot melt adhesives which are not softened at the temperatures of use or attacked by the reactants or products may be used to join both polymeric materials and wire into the appropriate configuration. Similarly staples, brads or other fastening means may by used. The wire may be sealed by welding. In a similar fashion, seals may be obtained with laser welding on the meltable materials.

The catalytic distillation structure may be individually and randomly placed into a reactor distillation column or arranged in specific patterns or groupings. Moreover, any catalyst bed may be a mixture of various shapes and sizes of the present catalytic distillation structures.

A variant of the invention is the use of a flexible cloth belt having a plurality of pockets along the length which are filled with the catalyst particles. FIGS. 9 and 10 illustrate the cloth belt 30 having pockets 32 which is laid over the sheet of demister wire 31. The cloth may be any material which is not reactive with the chemicals such as cotton, fiber glass, polyester, nylon and the like. FIG. 10 shows a top view along 3—3 of the cloth belt 30 as rolled with the demister wire 31. Showing the pockets 32 containing the catalytic material 33. A mixture may be placed into each pocket or different catalysts may be placed into different pockets.

FIG. 11 shows a catalytic distillation structure comprising flexible, semi-rigid open mesh tubular material filled with a particulate catalytic material said tubular material having two ends and having a length in the range of from about one-half to twice the diameter of said tubular material, a first end being sealed together along a first axis to form a first seam and a second end being sealed together along a second axis to form a second seam wherein the plane of the first seam along the axis of said tubular material and the plane of the second seam along the axis of said tubular material bisect each other at an angle of about 15 to 90°.

In FIG. 11, the catalyst structure 1 is composed of a wire mesh tube 6 that has been flattened together at one end 2 and then closed with staples 3 or other appropriate means such as crimping, welds, or sewn metal, etc. The tube container is then filled with the appropriate mixture of catalyst material 4 through the second end 5. The second end 5 of the wire mesh tube is then flattened and closed, so that the axis of the second closed end is perpendicular to the axis of the first closed end. The second end 5 may be closed with staples 3 or other appropriate means such as crimping, welds, or sewn metal, etc. The angle of the intersection of the plane of end 2 and the plane of end 5 is about 90°.

In the place of the wire mesh, equivalent materials made from polymers may be used. In place of staples or sewn seams, adhesives may be used, with the only proviso being that the materials employed withstand attack by the materials and conditions in the reactor distillation column.

The present invention has been illustrated by several embodiments, however the invention is not necessarily limited to just these illustrations. For example, a mixture of catalysts, in accordance with the present invention, may be place in any structure suitable for catalytic distillation. U.S. patent application Ser. No. 08/580,822 filed Dec. 29, 1995, which is incorporated herein in its entirety, discloses a versatile contact structure comprising a rigid frame comprised of at least two substantially vertical duplicate grids, a plurality of substantially horizontal rigid members spacing and holding the grids apart and a plurality of substantially horizontal fluid permeable, preferably wire mesh, tubes mounted to said grids to form a plurality of fluid pathways among said tubes. A mixture of catalysts may be placed in some tubes or different catalysts nay be placed in any of the fluid permeable tubes.

Figure 12:
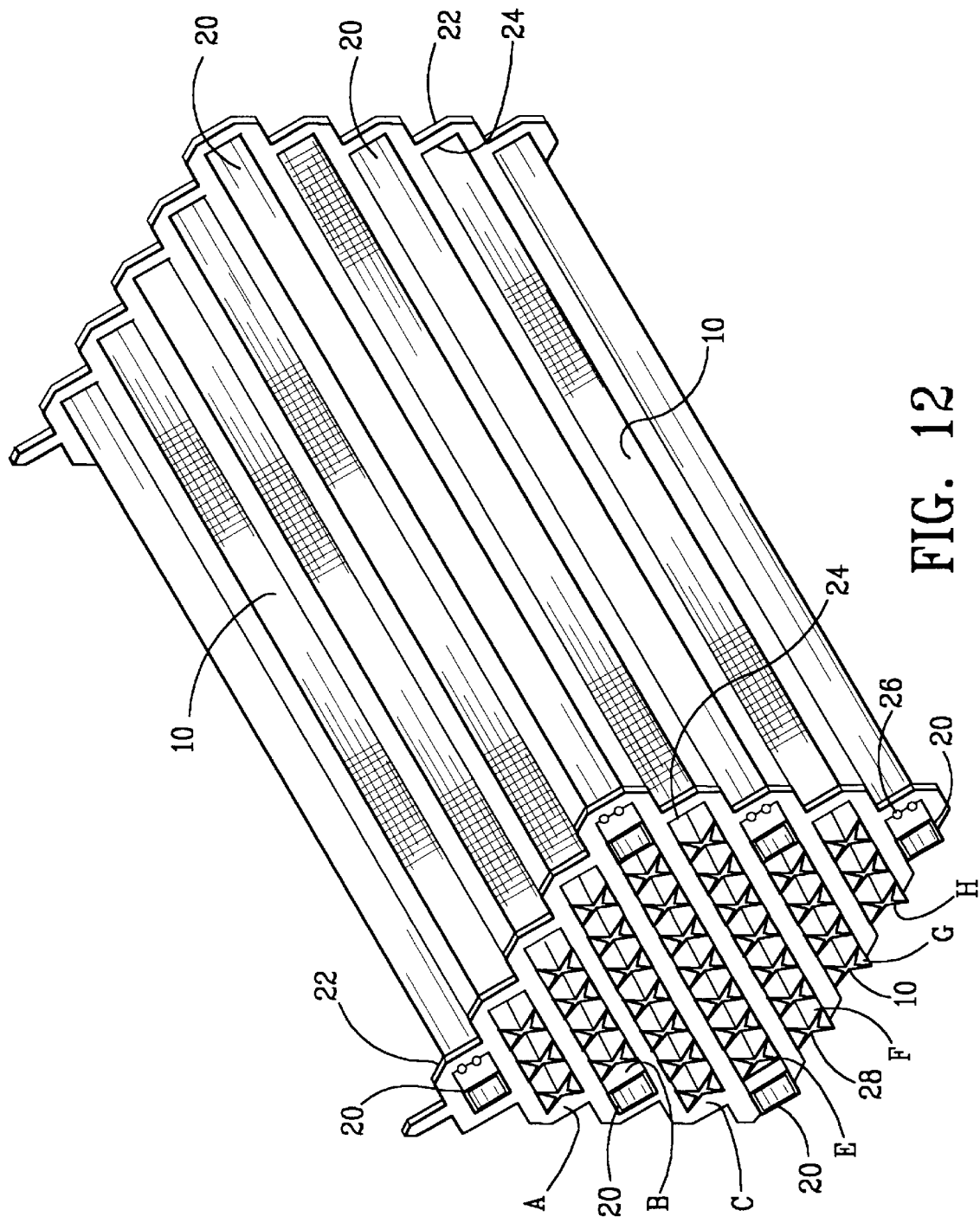
FIG. 12 is a perspective view of a rigid catalytic distillation structure containing at least two different catalysts.

FIG. 12 illustrates a rigid frame comprised of at least two substantially vertical duplicate grids, a plurality of substantially horizontal rigid members spacing and holding the grids apart and a plurality of substantially horizontal fluid permeable, preferably wire mesh, tubes mounted to said grids. Rectangular tubes 10 made of wire mesh are positioned into openings 24 in grids 22. The grids 22 are mirror images. They are spaced apart by hollow support rods 20, which are each secured to both grids, for example by welding 26. Other means of securing the grids together include the use of threaded rods and nuts or bolts and nuts (not shown). The resulting structure is rigid and capable of supporting at least one other structure of the present invention, and preferably loads of 100 to 200 pounds. The tubes 10 are normally of approximately the same size and configuration as the openings 24, so that the tubes are held fast and bind in the openings when the two end grids are secured together by the rods 20.

Under normal circumstances each tube 10 will contain a catalytic material 30 in particulate form. In the present invention diagonal rows A–H will have at least two different catalysts as described, or two or more catalysts may be interspersed in alternating tubes in each row. The ends of each tube 10 containing particulate catalytic material will be sealed, for example by crimping 28 or with inserted end caps (not shown) or welding.

In the catalytic structure depicted in FIG. 12, some of the tubes shown may also be void of any particulate material and/or contain inert particulate material.

The invention claimed is:

1. A catalytic distillation structure comprising a catalyst component intimately associated with a resilient component, which is comprised of at least 70–95 volume % open space for providing a matrix of substantially open space wherein said catalyst component comprises at least two functionally different catalysts, wherein said two functionally different catalysts are maintained separate and discrete within said distillation structure.

2. The catalytic distillation structure according to claim 1 comprising at least 10 volume % open space.

3. The catalytic distillation structure according to claim 1 wherein at least one catalyst is chemically different from another catalyst.

4. The catalytic distillation structure according to claim 1 wherein said catalyst component is contained within a plurality of pockets on a cloth belt, and said resilient component comprises a sheet of demister wire, said cloth belt and said demister wire being rolled together to form a catalyst bale.

5. The catalytic distillation structure according to claim 1 wherein said catalyst component is placed in a plurality of flexible, semi-rigid open mesh tubular elements sealed at both ends said plurality of flexible, semi-rigid open mesh tubular elements being laid at an angle across a sheet of demister wire and rolled into a bale.

6. The catalytic distillation structure according to claim 5 further comprising multiple seams along the axis of the tubular element to create a multiple link tubular element and said at least two functionally different catalysts are loaded into separate links of said tubular element.

7. A catalytic distillation structure according to claim 1 comprising:

(a) a sheet of demister wire;

(b) a cloth belt having a plurality of pockets laid across said sheet of demister wire;

(c) at least two functionally different catalysts placed into said plurality of belts; and (d) said demister wire and said cloth belt containing said at least two functionally different catalysts rolled together to form a bale.

8. A catalytic distillation structure according to claim 1 comprising:

(a) a sheet of demister wire;

(b) a plurality of flexible, semi-rigid open mesh tubular elements sealed at both ends laid across said sheet of demister wire at an angle;

(c) at least two functionally different catalysts placed into separate tubular elements of said plurality of tubular elements; and (d) said demister wire and said tubular elements containing said at least two functionally different catalysts rolled together to form a bale.

9. The catalytic distillation structure according to claim 8 further comprising multiple seams along the axis of the tubular element to create a multiple link tubular element and said at least two functionally different catalysts are loaded into separate links of said tubular element.

* * * * *